United States Patent
Mola et al.

(10) Patent No.: US 8,453,538 B2
(45) Date of Patent: Jun. 4, 2013

(54) CARTRIDGE BOTTOM BRACKET FOR A BICYCLE

(75) Inventors: Roberto Mola, Turin (IT); Gianpiero Scaltriti, Turin (IT); Riccardo Restivo, Turin (IT); Alessandro Sansone, Pinerolo (IT)

(73) Assignee: Aktiebolaget SKF, Göteborg (SE)

( * ) Notice: Subject to any disclaimer, the term of this patent is extended or adjusted under 35 U.S.C. 154(b) by 141 days.

(21) Appl. No.: 13/023,321

(22) Filed: Feb. 8, 2011

(65) Prior Publication Data

US 2011/0198479 A1 Aug. 18, 2011

(30) Foreign Application Priority Data

Nov. 17, 2009 (IT) .............................. TO2009A0885

(51) Int. Cl.
*B62M 3/00* (2006.01)
*B62K 19/34* (2006.01)

(52) U.S. Cl.
CPC ...................................... *B62K 19/34* (2013.01)
USPC ......... 74/594.1; 74/594.2; 280/235; 280/259; 248/674; 384/545; 403/339

(58) Field of Classification Search
CPC ...................................................... B62K 19/34
USPC ............. 248/674, 580, 599; 74/594.1, 594.2; 384/545; 403/305, 339, 341; 280/235, 259, 280/219
See application file for complete search history.

(56) References Cited

U.S. PATENT DOCUMENTS

| | | | | |
|---|---|---|---|---|
| 3,578,829 A * | 5/1971 | Hata et al. | ...................... | 384/458 |
| 3,903,754 A * | 9/1975 | Morroni | ....................... | 74/594.1 |
| 4,089,540 A * | 5/1978 | Liljequist | ...................... | 280/259 |
| 4,358,967 A * | 11/1982 | Kastan | ......................... | 74/594.2 |
| 4,406,504 A * | 9/1983 | Coenen et al. | ................ | 384/545 |
| 4,545,691 A * | 10/1985 | Kastan et al. | ................. | 384/458 |
| 5,281,003 A * | 1/1994 | Herman | ......................... | 301/2.5 |
| 6,116,114 A * | 9/2000 | Edwards | ....................... | 74/594.1 |
| 7,607,507 B2 * | 10/2009 | Lane et al. | ..................... | 180/260 |
| 2002/0096015 A1 | 7/2002 | Smith | | |

FOREIGN PATENT DOCUMENTS

GB 2385641 A 8/2003

* cited by examiner

*Primary Examiner* — Anita M King
(74) *Attorney, Agent, or Firm* — Mark A. Ussai; Bryan Peckjian

(57) ABSTRACT

A cartridge bottom bracket is for a bicycle having a tubular shell with a bore. The bottom bracket includes a spindle having opposing ends and a sealed cartridge disposed within the shell bore and about a central portion of the spindle so as to define opposing free end portions of the spindle. The cartridge includes a pipe having opposing ends, two rolling contact bearings disposed within the pipe adjacent to a separate one of the pipe ends and rotatably coupling the spindle with the pipe, and a tubular spacer disposed about the spindle and extending between the two bearings so as to establish a spacing distance between the bearings. Further, two shaped caps are each mounted on a separate one of the free end portions of the spindle and are disposed axially against a separate one of the bearings to enclose the free end portion of the spindle.

7 Claims, 1 Drawing Sheet

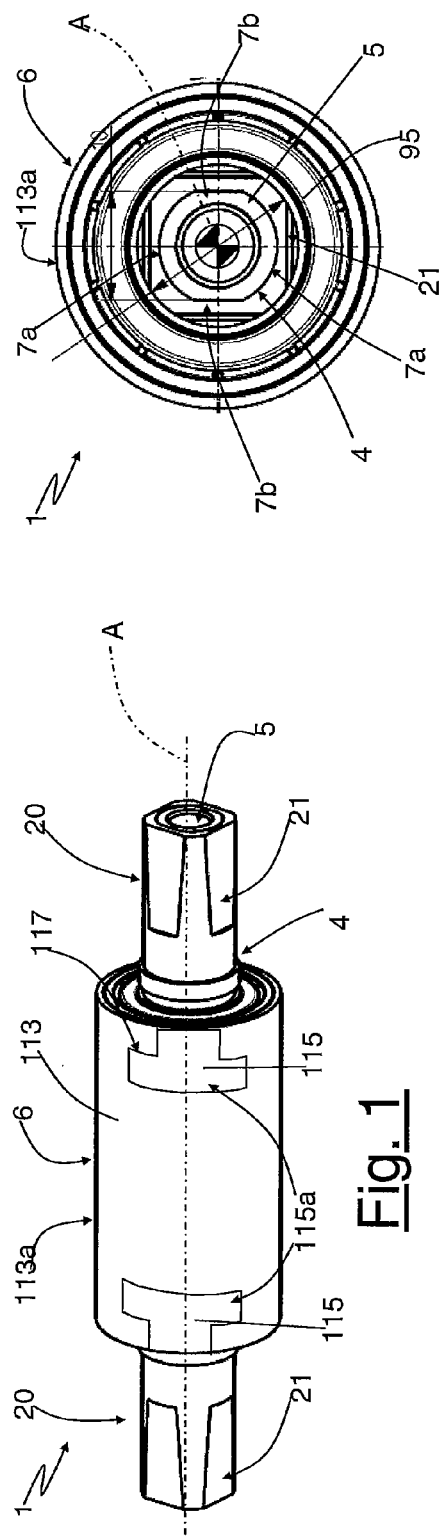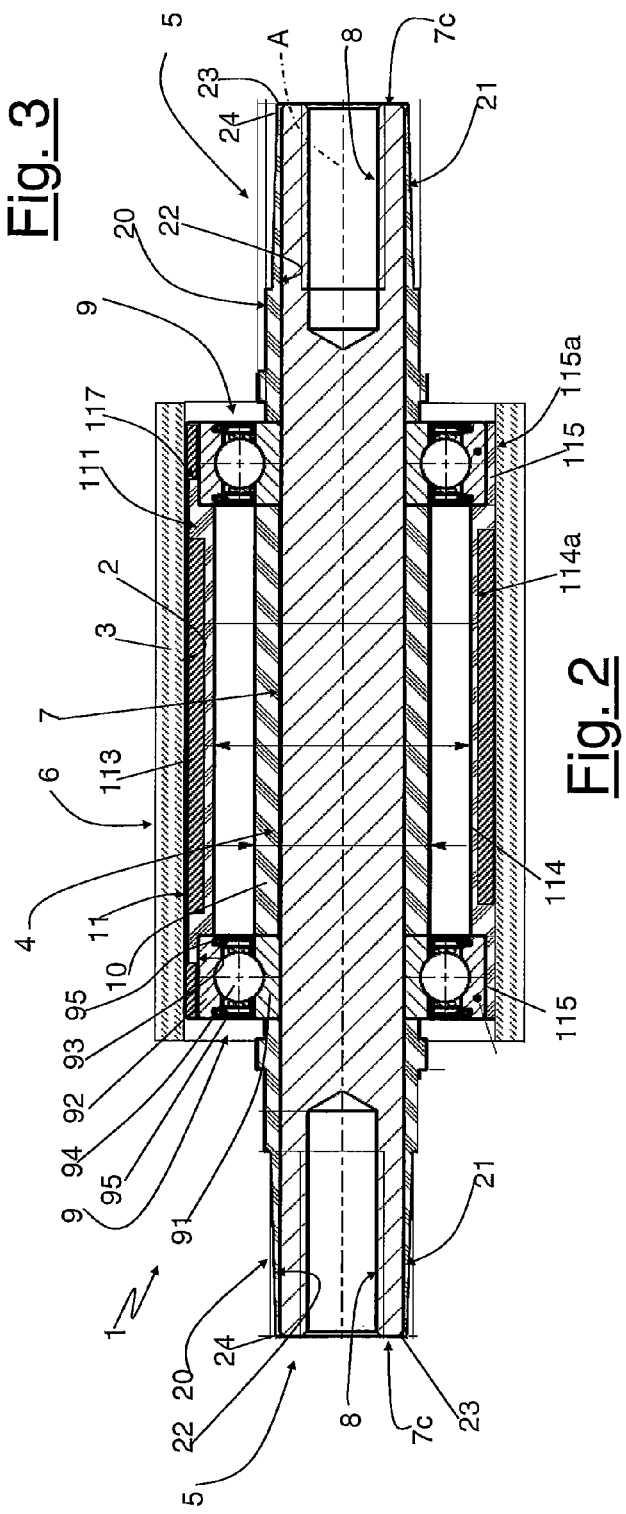

CARTRIDGE BOTTOM BRACKET FOR A BICYCLE

The present invention relates to bicycles, and more particularly to a cartridge bottom bracket for a bicycle.

Bottom brackets are known mechanical devices for connecting the cranks to the frame of the bicycle. In a relatively simple form, a bottom bracket may include a spindle having two ends each receiving a separate one of two cranks, two caps designed to be screwed to the frame to secure the spindle, and two sets of rolling-contact bodies held in place by respective cages and interposed between the caps and the spindle to allow the spindle to rotate with respect to the frame.

The two caps, the bearings and the spindle can be separate elements, as was once the norm, or can be preassembled in a sealed cartridge. Such known cartridges include a cylindrical pipe which sits around the spindle and houses inside itself the two sets of rolling-contact bodies with their respective cages, a first cap fixed to a first end of the cartridge and having an external thread for screwing to the bicycle frame, and a second cap. The second cap mounts onto a second end of the cartridge and has its own external thread to allow it to be screwed to the frame of the bicycle and to lock the cartridge with respect to the frame.

Cartridge-type bottom brackets of the type described above may be quicker and easier to fit than earlier bottom brackets, but are still rather complex, at least from the manufacturing point of view, and are still relatively expensive to produce. For example, in bottom brackets of the type described above, the outside of the spindle has to be machined to produce, for each end, a shoulder for the axial positioning either of the caps or of each set of rolling-contact bodies, and also has to be machined subsequently to be able to produce at each end a plurality of sloping planes for its connection to the cranks. This surface machining of the spindle also adds to the costs of manufacture of this component.

Lastly, the end portions of the spindles are not only placed in contact with the metal of the cranks, but are also subject to the action of external agents, and therefore, in order to increase the life of the bottom bracket, spindles currently in use require surface treatment and are predominantly zinc-coated. It is therefore sufficiently clear that these additional surface treatments which must be applied to the spindles only further increase the manufacturing costs of the bottom brackets described above.

SUMMARY OF THE INVENTION

It is an object of the present invention to provide a cartridge bottom bracket for a bicycle which, without altering the necessary characteristics of strength and stiffness, is nonetheless cheap and simple to produce.

In one aspect, the present invention is a cartridge bottom bracket for a bicycle, the bicycle having a generally tubular shell and a bore extending through the shell. The bottom bracket comprises a spindle having opposing ends and a sealed cartridge disposed within the shell bore and about a central portion of the spindle so as to define opposing free end portions of the spindle. The cartridge includes a pipe having opposing ends, two rolling contact bearings each disposed within the pipe generally adjacent to a separate one of the pipe ends and rotatably coupling the spindle with the pipe, and a tubular spacer disposed about the spindle and extending between the two bearings so as to establish a spacing distance between the bearings. Further, two shaped caps are each mounted on a separate one of the free end portions of the spindle and are each disposed axially against a separate one of the bearings so as to substantially enclose the free end portion of the spindle.

BRIEF DESCRIPTION OF THE SEVERAL VIEWS OF THE DRAWINGS

The invention will now be described with reference to the appended drawings, which show a non-restrictive example of the embodiment, in which:

FIG. 1 is a perspective view of a preferred embodiment of the cartridge bottom bracket for a bicycle according to the present invention;

FIG. 2 shows, in an enlarged axial cross-section, the bottom bracket of FIG. 1, depicted as disposed within a bicycle bottom bracket shell; and FIG. 3 is an end view of the bottom bracket seen in FIG. 2.

DETAILED DESCRIPTION OF THE INVENTION

Referring to FIGS. 1-3, a cartridge bottom bracket 1 is provided for a bicycle having a generally tubular shell 3 mounted to a frame (not shown) and a bore 2 extending through the shell 3. The bottom bracket 1 is disposable within the shell bore 2 and is used to connect together two cranks (neither shown). The bracket 1 basically comprises a spindle 4 having opposing ends, a sealed cartridge 6 disposed within the shell bore 2 and about a central portion of the spindle 4 so as to define opposing free end portions 5 of the spindle 4, and two shaped caps 20 are each mounted on a separate one of the free end portions 5 of the spindle 4.

The spindle 4 has a longitudinal axis A and a generally cylindrical outer surface 7 that preferably includes, at the two end portions 5, two cylindrical faces 7a and two flat faces 7b arranged on opposite sides of the axis A, alternating circumferentially with the cylindrical faces 7a. The spindle 4 also has, for each end portion 5, a corresponding threaded internal seat 8 that extends along the axis A inside the spindle 4 and is able to accommodate a screw (not shown) for fastening the corresponding crank (not shown).

The sealed cartridge 6 includes an outer pipe 11 having opposing ends, two rolling contact bearings 9 each disposed within the pipe 11 generally adjacent to a separate one of the pipe ends and rotatably coupling the spindle with the pipe, and an inner tubular spacer 10. The spacer 10 is disposed about the spindle 4 and extends between the two bearings 9 so as to establish a desired spacing distance between the bearings 9.

Each bearing 9 has an inner race 91 mounted on the surface 7 axially against the spacer 10, an outer race 92 inserted into a corresponding annular seat 93 in the pipe 11, and a plurality of rolling bodies 94 interposed between the inner race 91 and the outer race 92. Lastly, each bearing 9 comprises two seals 95 interposed between the inner race 91 and the outer race 92 to seal that bearing 9 and, simultaneously, also the cartridge 6, the interior of which is therefore completely isolated from the exterior. This eliminates both the risk of any form of contamination getting in and the need for maintenance.

In order to give the bottom bracket 1 a longer service life and make it more reliable, a shaped cap 20 is provided for each spindle end portion 5. Specifically, each cap 20 is disposed axially against the inner race 91 of a separate one of the bearings 9, and substantially covers or encloses, to thereby completely protect, the corresponding end portion 5 of the spindle 4. In other words, the surface 7 of the spindle 4 is substantially covered without any gaps by the two caps 20, by the inner races 91 of the bearings 9 and by the spacer 10, so that the spindle 4 does not need any special anti-corrosion surface treatments.

Preferably, each cap 20 is coupled with the associated spindle end portion 5 so as be non-rotatable relative to the spindle 4. Specifically, the caps 20 each have an internal through-seat 22 shaped to generally "copy" or complement the corresponding two cylindrical faces 7a and the two flat faces 7b, which therefore act as anti-rotation elements for each cap 20 with respect to the spindle 4. Each cap 20 is also shaped externally and is provided, depending on the application, with at least two outer surface sections 21 configured to non-rotatably engage with a separate one of the cranks (not shown).

That is, each cap 20 may have two, four, etc., surface sections 21, which may be equiangular, spaced at generally regular intervals circumferentially about the axis A and which are generally inclined with respect to the axis A to prevent any relative rotation of the spindle 4 with respect to the cranks (not shown) when the caps 20 are engaged in said cranks (not shown).

Lastly, each cap 20 comprises a folded edge 23 extending around the terminal edges 24 of the surface sections 21 and partially covers a corresponding end surface 7c of the spindle 4 through which the seat 8 is formed. In the example of an embodiment illustrated in FIG. 2, the edge 23 covers just a peripheral portion of the corresponding surface 7c, but, in an embodiment that is not shown but easily derived from the above description, the edge 23 may extend radially towards the axis A over the corresponding surface 7c as far as the entrance of the corresponding seat 8.

Each cap 20 may be formed of plastic overmolded directly onto the corresponding end portion 5 of the spindle 4 or may alternatively be "pre-formed" of a metal, such as sintered steel or aluminum, and then mounted on the corresponding end portion 5.

Each of the three alternative embodiments of the caps 20 has its own advantages: for example, a cap 20 made of overmolded plastic is very inexpensive but has limited strength, while a cap 20 of sintered steel is very strong but comparatively expensive. A cap 20 made of aluminium represents a solution midway between the two previous solutions in that it has moderate strength and is also moderately inexpensive.

If the caps 20 are overmolded directly onto the spindle 4, the two bearings 9 and the spacer 10 will be pre-assembled on said spindle 4 and held in their pre-assembly position during the overmolding process.

In order to reduce still further the cost of producing the bottom bracket 1 described above, the pipe 11 may also be made entirely of plastic overmolded directly onto the bearings 9 in such a way as to form the seats 93 directly during the overmolding process in contact with the outer races 92.

However, as illustrated in the accompanying figures, the pipe 11 preferably includes a reinforcement member 111 and a body 113. The reinforcement member 111 has opposing ends each providing an annular seat 93 for receiving a separate one of the two bearings 9, and the body 113 is preferably made of plastic integral with the reinforcement member 111, most preferably overmolded onto the reinforcement member 111.

Preferably, the reinforcement member 111 includes a central cylindrical body 114 and, at each tide of the cartridge 6, at least three stop elements 115 that extend axially out from the body 114 and are uniformly distributed around the axis A to define the seat 93 of the corresponding bearing 9.

The body 114 is defined radially outwardly by a cylindrical surface 114a coaxial with the axis A and having a diameter whose dimensions are between an outside diameter of the outer race 91 and a diameter of the centers of the rolling bodies 94, while the stop elements 115 are defined radially outwardly by a cylindrical surface 115a with a diameter whose dimensions are equal to the dimensions of a diameter of a cylindrical outer surface 113a of the body 113.

The stop elements 115 define between each other and with the corresponding outer races 92 spaces 117 complementary in shape to the shape of the stop elements 115, and define with the surface 114a a cylindrical annular chamber which, like the spaces 117, is filled with plastic during the overmolding thus defining, together with said spaces 117, the body 113.

In practice the reinforcement member 111 is covered almost completely by the body 113 with the exception of the stop elements 115, which come both radially and axially to the outside of the body 113 while remaining within the confines of the dimensions of said body 113.

The presence of the stop elements 115 not only gives the bottom bracket 1 sufficient rigidity for most applications but also makes the positioning of the bearings 9 even more precise. However, even if the pipe 11 is made entirely by overmolding, the bottom bracket 1 would still have sufficient stiffness for many applications, and the positioning of the bearings 9 would still be precise because it would be ensured by the pre-assembly in the mould.

In both of the alternative cases described above, overmolding of the inner pipe 11, or of just the body 113 can be done at the same time as overmolding of the caps 20, where the latter are also overmolded onto the spindle 4.

The plastic from which the pipe 11, or the body 113, or the caps 20 can be made may be either acrylonitrile butadiene styrene (ABS) or polypropylene (PP). Although these are of different base polymers, they are both low-cost thermoplastics that give excellent results when injection molded.

The above-described bottom bracket 1 is inserted into the bore 2 of the tubular shell 3 and then locked axially by two threaded caps (not shown), of which a first threaded cap has an axial stop on the shell 3 and screws onto said shell 3, while a second threaded cap has an axial stop on said bottom bracket 1 and is similarly screwed to the shell 3, closing the bottom bracket 1 tightly and locking it axially within the bore 2.

The threaded assembly caps, like the caps 20 and the other components of the bottom bracket 1, are symmetrical about a mid-plane orthogonal to the axis A and corresponding to a longitudinal plane of the bicycle: hence the symmetry of the components of the bottom bracket 1 also provides symmetry of assembly and of the bottom bracket 1 itself with respect to the longitudinal plane of the bicycle.

Clearly, the bottom bracket 1 as described above has a relatively simple structure and is relatively easy to manufacture, and yet possesses characteristics of stiffness and resistance to external contamination meeting or exceeding those of more sophisticated bottom brackets. Also, due to the sealed rolling-contact bearings 9, the cartridge 6 is essentially totally impermeable, thereby providing the bottom bracket 1 with a long service life. Furthermore, by completely protecting the entire spindle 4 by the use of the components of the bottom bracket 1 themselves, specifically the caps 20, and by also constructing the caps 20 to function as connectors for the cranks, the spindles 4 have a relatively simple shape and do not require special coatings. This further reduces the cost of the entire product.

The invention is not intended to be limited to the embodiments described and illustrated herein, which are to be regarded as examples of embodiments of the cartridge bottom bracket for a bicycle, and which are open to further modifications in respect of the shapes and arrangements of parts, details of construction, and assembly. As such, it will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A cartridge bottom bracket for a bicycle, the bicycle having a generally tubular shell and a bore extending through the shell, the bottom bracket comprising:

a spindle having opposing ends;

a sealed cartridge disposed within the shell bore and about a central portion of the spindle so as to define opposing free end portions of the spindle, the cartridge including a pipe having opposing ends, two rolling contact bearings each disposed within the pipe generally adjacent to a separate one of the pipe ends and rotatably coupling the spindle with the pipe, and a tubular spacer disposed about the spindle and extending between the two bearings so as to establish a spacing distance between the bearings; and two shaped caps each mounted on a separate one of the free end portions of the spindle and disposed axially against a separate one of the bearings so as to substantially enclose the free end portion of the spindle, and wherein the bicycle includes two cranks, each cap being coupled with the spindle so as be non-rotatable relative to the spindle and having at least two outer surface sections configured to non-rotatably engage with a separate one of the cranks.

2. The bottom bracket as recited in claim 1 wherein each bearing has an inner race and the spindle has a generally cylindrical outer surface including two opposing flat faces at each one of the spindle free end portions, the spindle outer surface being substantially covered by the two caps, the inner races of the two bearings, and the spacer.

3. The bottom bracket as recited in claim 1 wherein the at least two outer surface sections includes four generally equiangular outer surface sections, each of the four outer surface sections being generally inclined with respect to the spindle so as to be non-rotatably engageable within a separate one of the two cranks.

4. The bottom bracket as recited in claim 1 wherein each cap is one of:

formed of plastic and overmolded directly onto one of the free end portions of the spindle; and formed of metal and mounted on one of the free end portions of the spindle.

5. The bottom bracket as recited in claim 4 wherein each cap is formed of one of sintered metal and aluminum.

6. The bottom bracket as recited in claim 4 wherein the pipe is formed of plastic and is overmolded directly onto the two rolling-contact bearings.

7. The bottom bracket as recited in claim 6 wherein the pipe includes a reinforcement member having opposing ends each providing an annular seat for receiving a separate one of the two bearings and a plastic body overmolded onto the reinforcement member.

* * * * *